Figure 1:
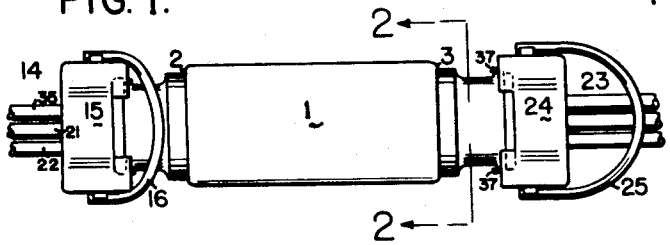

March 4, 1958

C. R. RHODES 2,825,782

STRAIGHT-THROUGH RELAYS

Filed Dec. 18, 1956

*INVENTOR.*
CHESTER R. RHODES
BY Harry R. Lubcke
AGENT ced Mar. 4, 1958

2,825,782
STRAIGHT-THROUGH RELAYS

Chester R. Rhodes, Whittier, Calif., assignor to Electronic Specialty Co., Los Angeles, Calif., a corporation of California Application December 18, 1956, Serial No. 629,067

14 Claims. (Cl. 200—87)

My invention relates to electromagnetically actuated electrical contacting devices and particularly to a double-ended structure for such devices supportable by the electric cables connected thereto.

The classical electrical relay was adapted to operate while stationary in a favorable environment. Constantly increasing demands upon relay performance have been made as mobile operation was required, as the airplane was developed and now as missiles travel faster and faster. In both airplanes and missiles of the latest type the friction of air on the skin of the vehicle is a source of extreme heat. This heat is conducted to the frame thereof and heats devices that are attached thereto. Certain elements of the airplane or missile must be insulated against such heat, such as the insulated electric circuit cables, since the capability of such insulation to resist destruction due to heat is limited. By placing such circuit switching elements as relays directly in an electric cable run excellent isolation from heat and vibration is immediately and inexpensively achieved.

The prior art has invariably constructed an electrical relay as a single-ended structure. This has conventionally been mounted upon some convenient portion of the frame of the vehicle upon which it functions. The cantilever type structure resulting, with wire connections usually running in various directions from the relay terminals, results in an unfavorable type of structure with respect to vibration. Such mounting, furthermore, subjects the relay to the maximum vibration and temperature experienced by the vehicle.

In contrast thereto I provide a double-ended relay structure which is mounted in the cable run with which it coacts electrically. I am able to separate large potentials upon terminals a much greater distance than ever before by placing these at opposite ends of my relay, and by the same arrangement am able to reduce stray capacitance and other residual electrical properties. Specifically, connector plugs are provided and mechanically attached to the plural conductors or to the plural conductor cables to which the plugs are electrically attached. Latch means are provided between the relay housing and each plug to form an integral mechanical structure in which the relay is supported by said conductors or cables.

An object of my invention is to provide a relay structure having a plurality of connections at each end of an elongated housing.

Another object is to provide a plurality of connections at each end of said housing adapted to coact both electrically and mechanically with similar connections on the ends of plural cables.

Another object is to provide a relay structure allowing straight-through connection in what would be a straight run of cable were the relay absent.

Another object is to provide enclosing insulation around each of a plurality of individual connections to effect a tight seal against foreign material of all kinds and to minimize electrical arc-over by operation at high altitudes in the atmosphere.

Another object is to provide a relay and connective structure arranged to remove terminals having relatively high potential differences from relative adjacency.

Another object is to provide a relay and connective structure in which the capacitance between selected connections is very small.

Another object is to provide a relay of small size and light weight that is structurally a part of the electrical conductors to which it is connected.

Figure 2:
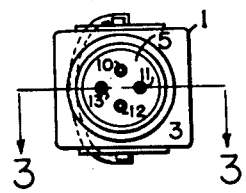
Figure 3:
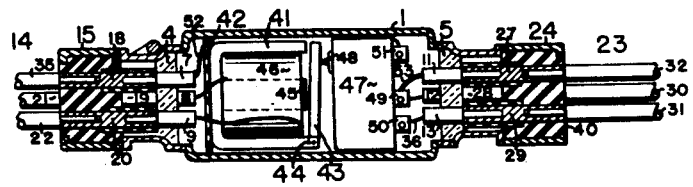
Figure 4:
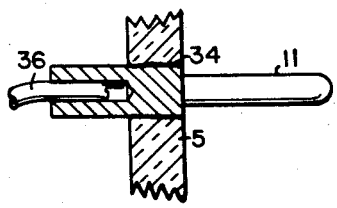
Figure 5:
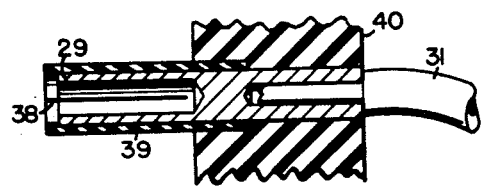
Figure 6:
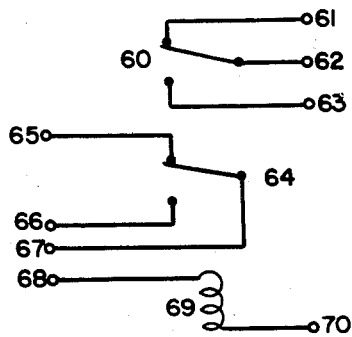
Figure 7:
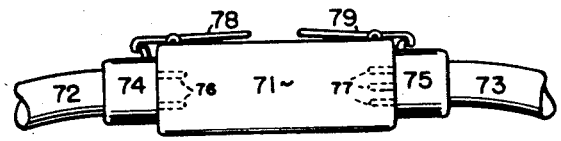

Other objects of my invention will become apparent upon reading the following detailed specification and upon examining the related drawings, in which:

Fig. 1 shows an external side elevation view of my relay and connecting cabled conductors, Fig. 2 shows an end elevation looking toward the relay structure proper, Fig. 3 shows a side sectional elevation in which the internal connections and relay elements are illustrated, Fig. 4 shows an enlarged view of a male connector, or contact, Fig. 5 shows an enlarged view of a female connector, or contact, Fig. 6 shows a schematic diagram of an alternate form of my invention, and Fig. 7 shows the structural aspects of another alternate form of my invention.

In Fig. 1, numeral 1 represents a tubular metal housing or case, the cross-section of which is rectangular, as shown in Fig. 2. Ends 2 and 3 are soldered, brazed or welded to the housing after the relay mechanism has been placed therein. Each end is fabricated with a glass-like or ceramic insulating diaphragm in the header. This is identified as element 4 on end 2 and element 5 on end 3. Each header has plural, and characteristically four, male contacts embedded therein, such as 6, 7, 8 and 9 in diaphragm 4, and 10, 11, 12 and 13 in diaphragm 5, see Figs. 2 and 3. Contacts 6 and 10 are not shown in Fig. 3 because of the sectional view.

What may be termed the incoming or controlling group of cabled conductors are at the left in the figures, referenced 14. In Fig. 7 cable 72 is the incoming one. In this specification and the appended claims a "group of cabled conductors" and a "cable" are considered synonymous. In Figs. 1 and 3 the group of cabled conductors terminate in plug 15. This is securely fastenable to the main structure 1, 2 by an over-center type latch 16 shown in the closed position. Within plug 15 there are female contacts 17, 18, 19 and 20, which engage male contacts 6, 7, 8 and 9, respectively. The female contacts are connected by soldering or crimping to corresponding wires 35, 21 and 22 in group 14. Wires 21 and 22 are connected to the actuating coil of the relay, to be further described later, while wire 35 connects to a switch leaf or blade which makes contact with either of two fixed contacts depending upon energization or not of the coil. Because of these functions the left hand conductors are known as the incoming or controlling ones. In this particular arrangement contact 6 is not used.

The outgoing or controlled group of conductors are at the right in the figures, referenced 23. With an equivalent construction to that previously described a fitting or plug terminates the group. This is fastened to the main structure by latch 25, which is shown in the open position in Fig. 1. Fingers 37 are actuated by latch 25 and when the latter is moved to the position shown for latch 16 the fingers securely engaged approximately half of the circumference of the adjacent rim of the relay ends. Female contacts 26, 27, 28 and 29 engage male contacts 10, 11, 12 and 13, respectively, in Fig. 3. The male contact 10 and the corresponding female contact 26 are not shown in Fig. 3 because of the sectional nature of this view in accordance with drafting practice. Wires 30 and 31 each connect to one of the two fixed contacts of the relay previously mentioned, while wires 32 and 33 connect to additional like fixed contacts to be later described. Wire 33 is not seen because of the sectional view of Fig. 3.

Fig. 4 shows an enlarged view of a representative male contact 11. This is embedded in the glass-like diaphragm 5 of the header or end of the housing. The contact has a rough section 34 to insure intimate bonding to the diaphragm. The diameter of this male contact is such as to constitute a firm sliding fit with the female contact. Wire 36 is soldered or crimped to the rear of contact 11.

Fig. 5 shows an enlarged view of a representative female contact 29. This is provided with a slot 38 to allow sufficient spring action to make a firm sliding fit for the male contact. Wire 31 is attached to the female contact by soldering, crimping or in an equivalent manner providing good electrical contact and mechanical strength. An insulating sleeve or tube 39, for example, of teflon, is fastened snugly over contact 29 and into the insulating body 40 of plug 24. The forward face of the sleeve is accurately dimensioned so as to fit against surface 5 with a slight compression of the sleeve when the male and female connections are fully engaged. In this manner I am able to relatively isolate each pair of engaging contacts from each other pair, thereby minimizing contamination from dust, dirt, moisture and/or nuclear products. The several female contacts are held in plug 24 by insulating body 40, of a suitable synthetic resin, "Kel-F" (DuPont), or other high grade insulating material.

Considering now the interior construction of the relay as shown in Fig. 3, element 41 is a horse-shoe shaped stationary magnetic structure. This is mounted with a slab of insulating material 42 adjacent to the female-male connecting wires within the relay to prevent shorting in assembly. An armature 43 is pivotally supported upon the stationary magnetic structure 41 by pin hinge 44. Pole piece 45 extends through energizing coil 46 as an inner core to complete the armature-attracting structure. Element 47 is a microswitch or other type of contactor having stationary and movable contacts. As shown, armature 43 depresses actuating plunger 48 in the non-attracted position shown. A spring, not shown, acts against the magnetic pull and causes the armature to assume the position shown in the absence of magnetic energization. In this position a movable contact is against one stationary contact, as shown at 60 in Fig. 6. When coil 46 is energized with electric current armature 43 moves to the left and plunger 48 outward from switch 47 so that the switch arm moves to the other contact, as the lower one at 60 in Fig. 6. One such stationary contact is connected to switch terminal 49 and the other to terminal 50, which, in turn, are connected by very short wires to male contacts 12 and 13. Terminal 51, on the other hand, is connected to incoming male contact 7 by wire 52, which is seen adjacent to the terminal and contact but is otherwise behind the relay structure and cannot be seen. I often construct the relay with two microswitches 47, one behind the other in Fig. 3. The outgoing contacts from the second switch thus connect to male contacts 10 and 11, of which connection 53 to contact 11 may be seen in Fig. 3.

It is now seen how the novel advantages outlined in the several objects of my invention are attained.

Certain alternate embodiments of my invention are possible, one of which is schematically shown in Fig. 6. In this circuit one set of the contactors of the relay is connected exclusively to one cable and another set to the other cable, while the coil circuit passes through both cables.

One set of the actuated relay contactors is generally represented by numeral 60. Numerals 61, 62 and 63 identify male contacts at, say, the right hand end in Fig. 3. Similarly, numeral 64 generally represents the second set of relay contactors, constituting a single-pole double-throw switch. Numerals 65, 66 and 67 identify the male contacts at the left hand end of the relay structure. From one further contact, 68, at the left, relay coil 69 receives one connection of the energizing circuit, while at contact 70, at the right, there is the other connection.

An advantage of the connection scheme of Fig. 6 is that one set of relay contactors, say 60, may be at high potential with respect to other associated circuits. The right hand group of cabled conductors or cable is then a high voltage affair while the left hand one is not. For such an arrangement the one-cable connection for energizing coil 69 as shown in Fig. 3 might be preferred. In Fig. 3 the corresponding elements are conductors 21 and 22, male contacts 8 and 9 and coil 46. The straight-through connection of the coil in Fig. 6 was presented to show this novel wiring arrangement.

The connection scheme of Fig. 6 may also be employed when it is desired to reduce capacitative or inductive stray influence from one circuit upon another to a minimum. Even in Fig. 3 it will be noted that this influence upon a non-contacted contactor, as that connected to contact 13 for example in one throw of the switch, is a minimum. The switch blade circuit, which includes terminal 51, wire 52 and contact 7, is as far away from the non-contacted contactor as possible and very much farther than the long-standing practice of the prior art of bringing all relay connections through a single header or equivalent member.

Another alternate embodiment is shown in Fig. 7. The body of the relay 71 and the internal portion thereof per se are essentially the same as previously illustrated. This embodiment, however, is suited for attachment to plural conductor cables having outside sheaths 72 and 73. These are secured to plugs 74 and 75, which now have male contacts 76 and 77 instead of female contacts. With male contacts thus the over all structure may be decreased somewhat in length whereas with the female contacts in the plug there is less danger of shorting live contacts if the relay is temporarily removed and the rest of the vehicle circuits energized; i. e., per Fig. 3.

In Fig. 7 female contacts in the relay headers mate with the male contacts but the female contacts have not been shown for sake of clarity. Over-center latches 78 and 79 are attached to the relay in this embodiment and fasten onto projections shown on plugs 74 and 75.

It will be understood that the main housing of my relay may be circular in cross-section rather than rectangular as shown in Fig. 2, particularly for an internal relay construction that does not extend beyond a cylindrical coil.

Also, the male and female contacts previously illustrated may be replaced with butt type connections, particularly where low contact resistance may not be required.

A threaded sleeve on the plugs and threads on the ends of the relay case may be employed in lieu of latches 16 and 25 or 78 and 79.

The relay may contain time-delay elements and may otherwise be quite differently embodied, even to adaptability for alternating current operation.

For clarity the drawings are of larger scale than the actual size of preferred forms of my relay. Of course, the size, proportions, shape and electrical properties of various parts of my relay may be altered without departing from my invention.

Having thus fully described my invention and the manner in which it is to be practiced, I claim:

1. A relay having plural contact means and actuating means for said contact means comprising a housing having two ends enclosing both said means, a plurality of electrical contacts only in each of the ends of said housing, electrical cables each having plural conductors, connective means electrically and mechanically connected to each said cable adapted to make electrical connection to said electrical contacts, and positive means to mechanically attach said connective means to said housing for the support of said housing by said cables.

2. A relay having plural contact means and magnetic actuating means therefor comprising an elongated housing having ends enclosing both said means, a plurality of separate electrical contacts only in each of said ends, plural electrical cables each having plural conductors, plug means electrically and mechanically connected to an end of each said cable adapted to make electrical connection to said separate electrical contacts, and positive means to mechanically attach said plug means to said housing for the support of said housing by said cables.

3. An electromechanical relay having contact means and coacting magnetic actuating means comprising an elongated double-ended housing enclosing both said means, a plurality of insulated electrical contacts only in each of the ends thereof, a plurality of plural conductor electrical cables, further electrical contacts attached to the plural conductors thereof to make contact with said insulated contacts, and means to positively mechanically attach said cables to the ends of said housing.

4. A relay having plural contactors and magnetic actuating means therefor comprising a double-ended case enclosing both said contactors and said actuating means, a plurality of insulated electrical contacts only in each of the ends of said case arranged to position contacts having similar operating potentials relatively adjacent; plural conductor electrical cables, further electrical contacts attached to the plural conductors of said cables to make contact with the plurality of said insulated electrical contacts, said further contacts simultaneously making positive mechanical contact with said insulated electrical contacts to reliably support said relay by said cables when connected thereto.

5. An electrical relay having contact means and electromagnetic actuating means therefor comprising a double-ended housing enclosing both said means, an insulating area only in each of the ends of said housing, a plurality of electrical contacts in each of said insulating areas, both said means arranged to position relatively adjacent contacts at similar potentials in the operation of said relay; two groups of plural electrical conductors, electrical contacts attached to the ends of said conductors each adapted to make contact with one of the plurality of electrical contacts in one of said insulating areas, said contacts simultaneously making mechanical contact one with the other to support said relay by said conductors without allowing inadvertent separation of said relay from said conductors.

6. An electrical relay having plural switch contact means and electromagnetic means to actuate the same comprising a double-ended hermetic case enclosing both means, an insulating area only in each of the ends of said case, a plurality of electrical contacts passing through each of said insulating areas, circuits for both said means arranged to position adjacent contacts at similar voltages in the operation of said relay; two plural conductor electrical cables, a group of electrical contacts attached to adjacent ends of said cables and connected to the conductors thereof adapted to make contact with the plurality of electrical contacts in one of said insulating areas, said contacts simultaneously making firm mechanical contact with the electrical contacts in said insulating areas to reliably support said relay by said cables.

7. An electrical relay comprising plural contact means, electromagnetic means for actuating said contact means, an elongated tubular metal housing surrounding said means having enclosing ends, insulating areas only in said ends, a plurality of electrical contacts in each of said insulating areas, relatively adjacent contacts of each said plurality connected to said contact means operable at similar voltages, further electrical contacts arranged in two groups, each group adapted to engage the plurality of said electrical contacts at one end, each group further fastened to a plug-like element having plural conductors attached thereto for unified electrical and mechanical engagement of said plurality of electrical contacts, each of the electrical contacts of each said group having an insulating sleeve to bear closely upon one of said insulating areas, and a latch-like device to connect each of said plug-like elements to said housing.

8. An electrical relay comprising plural contact means, electromagnetic means for actuating said contact means, a double-ended tubular metal housing completely surrounding both said means having enclosing ends, insulated areas exclusively in said ends, a plurality of electrical contacts in each of said insulated areas, substantially adjacent contacts of each said plurality connected to said contact and electromagnetic means operable at similar voltages, further electrical contacts arranged in two groups, each group adapted to engage the plurality of said electrical contacts at one end of said housing, each group further fastened to a plug element for unified engagement of said plurality of electrical contacts and to a plural conductor electric cable, each of the electrical contacts of each said group having an insulating tube to bear closely upon one of said insulated areas, and a latch device to connect each said plug element to said housing to mechanically support said relay by said cable.

9. In an electrical relay having plural contactors and magnetic means for actuating said contactors, an elongated double ended structure comprising a tubular metal housing, only one header sealing each end of said housing having an insulating diaphragm and a plurality of electrical connectors in each said diaphragm, said housing enclosing both said contactors and said magnetic means, connections between said connectors in said diaphragms and said contactors; separate electrical plugs, each said plugs having plural connectors to electrically and mechanically engage connectors in one said diaphragm, each said plug positively mechanically fastened to said housing and to plural conductors to electrically connect and to mechanically support said relay by said conductors.

10. In a unidirectional current electrical relay having plural sets of contacts and electromagnetic means for actuating said contacts, a double-ended structure comprising a tubular metal housing, a header sealing each end of said housing, said header having a glass-like insulating diaphragm with a plurality of electrical connectors in each said diaphragm, said housing inclosing both said contacts and said electromechanical means, connections to connect the connectors in said diaphragms to said electromagnetic means and said sets of contacts; two separate electrical plugs, each said plug having plural connectors to electrically and mechanically engage corresponding connectors in one said diaphragm, said plural connectors having insulating means to bear intimately against the glass-like diaphragm adjacent thereto when the connectors of both diaphragm and plug are fully engaged, a latch to mechanically fasten each said plug to said housing, a plural conductor cable attached to each said plug, said relay supportable by said cables when said plugs are fastened to said housing.

11. In a direct current electrical relay having plural sets of contacts for controlling and controlled circuit connections and electromagnetic means for actuating said contacts, a double-ended structure comprising a tubular metal housing, a header hermetically sealing each end of said housing, each said header having a glass-like insulating diaphragm, a plurality of electrical connectors in each said diaphram, said housing enclosing both said contacts and said electromagnetic means, connections to connect the connectors in one said diaphram to said electromagnetic means and controlling circuit contacts and connections to connect the connectors in the other said diaphram to controlled circuit contacts; two separate electrical plugs, each said plug having plural connectors to electrically and mechanically engage corresponding connectors in one said diaphram, said plural connectors in said plugs each having insulating sleeves to bear intimately against the glass-like diaphram adjacent thereto when the contact connectors of both diaphram and plug are fully engaged, an over-center latch to mechanically fasten each said plug to said housing, a plural conductor cable attached to each said plug, said relay supportable by said cables when said plugs are fastened to said housing.

12. In an electrical relay having plural contactors for controlling and controlled circuit connections and electromagnetic means for actuating said contactors a double-ended structure comprising a tubular metal case, two end headers hermetically closing said case and having glass-like insulating diaphrams with a plurality of male electrical conductor contacts embedded in each, said case and headers proportioned to enclose both said contactors and said electromechanical means, means to connect the male contacts at one end to said electromagnetic means and to controlling circuit connections, means to connect the male contacts at the other end to controlled circuit connections of said relay; plural female electrical conductor contacts arranged in one unified group to engage the male contacts at one end of said relay, each said female contact having an insulating surrounding sleeve sufficiently long to bear tightly against the glass-like diaphram holding said male contacts when said female contacts fully engage said male contacts, and further female electrical conductors contacts arranged in another unified group to engage the male contacts at the other end of said relay, said relay structure supportable by the two groups of contacts; each said group of female contacts adapted to be fastened to said case by an over-center latch.

13. In a direct current electromechanical relay having plural contactors for controlling and controlled circuits and electromagnetic means for actuating said contactors, a two-ended structure comprising a tubular metal housing of rectangular cross-section, two end headers hermetically closing said housing having glass-like insulating diaphrams with a plurality of male contacts passing through each of said diaphrams, said housing and headers enclosing both said contacts and said electromagnetic means, means to connect the male contacts at one end to said electromagnetic means and to controlling circuits, means to connect the male contacts at the other end to controlled circuits of said relay; plural female electrical conductor contacts connected to plural electrical conductor and arranged in one unified group to engage the male contacts at one end of said relay, each said female contact having a teflon insulating surrounding sleeve sufficiently long to intimately bear upon the glass-like diaphram holding the male contacts when said male and female contacts are fully engaged, and further female electrical conductor contacts connected to plural electrical conductors and arranged in another unified group to engage said male contacts at the other end of said relay, said relay structure supportable by the two groups of female contacts, and an over-center locking type latch to fasten each group of female contacts to said headers.

14. In an electrical relay having plural contactors for controlling and controlled circuit connection and electromagnetic means for actuating said contactors, a double-ended relay structure comprising a tubular metal housing, two end headers to close said housing having glass-like insulating inserts with a plurality of female conductor contacts therein, said housing and said headers proportioned to enclose both said contactors and said electromagnetic means, means to connect the female contacts at one end to said electromagnetic means and to controlling circuit connections, means to connect the female contacts at the other end to controlled circuit connections; plural male conductor contacts arranged in one unified group to engage the female contacts at one end of said relay, each said male contact having an insulating surrounding sleeve sufficiently long to intimately bear on the glass-like insert holding said female contacts when said male and female contacts are fully engaged, and further male conductor contacts arranged in another unified group to engage the female contacts at the other end of said relay, said relay structure supportable by the two groups of male contacts, and a latch to mechanically lock each group of male contacts to said relay structure.

References Cited in the file of this patent

UNITED STATES PATENTS

| | | |
|---|---|---|
| 913,809 | Carr | Mar. 2, 1909 |
| 2,013,241 | Hefner | Sept. 3, 1935 |
| 2,506,171 | Perillo | May 2, 1950 |